United States Patent [19]
Tominaga

[11] Patent Number: 5,144,909
[45] Date of Patent: Sep. 8, 1992

[54] CELL-FORMING ASSEMBLY FOR A HOUSEHOLD AQUARIUM

[75] Inventor: Kazutoshi Tominaga, Higashiosakashi, Japan

[73] Assignee: Kabushiki Kaisha Tominaga Jyushi Kogyosho, Osaka, Japan

[21] Appl. No.: 689,187

[22] Filed: Apr. 22, 1991

[51] Int. Cl.$^5$ .............................................. A01K 63/00
[52] U.S. Cl. ...................................................... 119/5
[58] Field of Search ............................ 119/5, 3, 15, 17

[56] References Cited
U.S. PATENT DOCUMENTS

| | | | |
|---|---|---|---|
| 3,216,395 | 11/1965 | Girard | 119/5 |
| 3,288,110 | 11/1966 | Goldman et al. | 119/5 |
| 3,512,503 | 5/1970 | Willinger | 119/5 |

Primary Examiner—John G. Weiss
Attorney, Agent, or Firm—Collard & Roe

[57] ABSTRACT

A cell-forming assembly for use with a household aquarium comprises a main body having an open top and front faces. The assembly further comprises fastening members for detachably attaching the main body to the aquarium, and partitions which are removably placed in the main body so as to divide an internal space thereof into cells so that the aquarium can accommodate the fighting fishes such as "betta" separated from other aquarium fishes. With the partitions removed, the interesting behavior of the fighting fishes can be observed.

4 Claims, 3 Drawing Sheets

1

CELL-FORMING ASSEMBLY FOR A HOUSEHOLD AQUARIUM

BACKGROUND OF THE INVENTION

The present invention relates to a cell-forming assembly which is equipped in a household aquarium so as to divide a part of its inner space into cells adapted to isolate the so-called fighting fishes such as "betta" from other usual aquarium fishes accommodated in the same household aquarium.

Popular household aquariums which have been widely used comprise in general a transparent surrounding wall of glass or plastics and are of a box-like shape.

Such a household aquarium may be used to accommodate not only the same species of aquarium fishes but also in some cases different species thereof. Though there may be no problem in the former case, it has been observed that in the latter cases the different aquarium fishes often fight with one another to mutually hurt or occasionally devour one another. In particular, inoffensive aquarium fishes can hardly share the same aquarium space with the fighting fishes such as betta.

To resolve such a problem, it would be feasible to simply form a fixed untransparent cell or cells within a household aquarium so that various kinds of fishes can be accommodated in the same aquarium for watchers' enjoyment. However, such an aquarium would not excite amusement because the fighting fishes' outstretched fins cannot be observed when they often frighten other fishes away to quarrel over their territories. They would not so behave, if they were separated by the simple cell from the other fishes within the same aquarium.

SUMMARY OF THE INVENTION

Therefore, an object of the present invention is to provide a cell-forming assembly which is easily equipped in a household aquarium so as to divide a part of its inner space into cells.

Another object of the invention is to provide a cell-forming assembly which forms such cells that can safely accommodate the fighting fishes separated from other inoffensive fishes, wherein the natural behavior of the fighting fishes can be observed to arouse interest.

Further objects will become apparent from the preferred embodiments, which are described hereinafter by way of example and referring to the accompanying drawings, but are not limitative of the scope of invention.

According to the invention, a cell-forming assembly for use in combination with a household aquarium comprises a main body which is long sideways and has an open top and front faces. The main body is composed of a rectangular back wall long sideways, a bottom plate extending forwards from the lower edge of the back wall, a pair of opposite side walls connected to both side edges of the back wall and bottom plate. The cell-forming assembly further comprises fastening members attached to the main body so as to detachably secure it to an aquarium wall so that the open front face of the main body may be disposed substantially in contact with the inner surface of the aquarium wall. The cell-forming assembly still further comprises at least one partition which must be detachably held inside the main body, in order that an internal space which is defined by the main body and aquarium wall may be divided into a row of cells arranged from side to side. The partitions are made of a plate which is of a transparency limited to such a degree that aquarium fishes in adjacent cells are not likely to irritate one another.

The fastening members which detachably secure the main body to the inner surface of aquarium may preferably be a pair of sucking discs which are provided at both sides of the front face of said main body.

The partitions, which define the cells to accommodate the fighting fishes so as not to irritate one another, may be deep-colored plastics plates, frosted glass plates having a ground or abraded surface, or the like. Instead of such translucent plates, any opaque plates may be used to perfectly prevent the fighting fishes from looking at other fishes.

BRIEF DESCRIPTION OF THE DRAWINGS

In the drawings illustrating a cell-forming assembly in the preferred embodiment of the present invention.

DETAILED DESCRIPTION OF PREFERRED EMBODIMENTS

Figure 1:
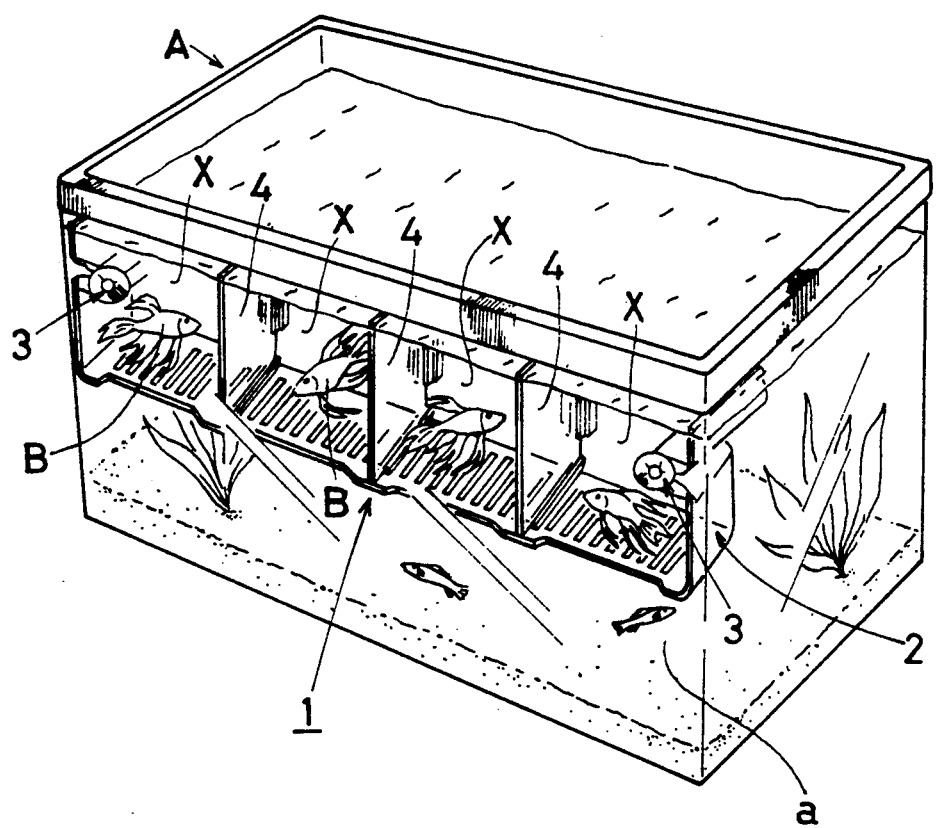
FIG. 1 is a perspective view showing the cell-forming assembly in its entirety, the assembly installed within a household aquarium.

As shown in FIG. 1, a cell-forming assembly 1 of the invention is used with a household aquarium "A", the assembly being substantially in contact with the inner surface of an aquarium wall "a". The assembly comprises a main body 2 having an open top and open front faces. Further, the assembly comprises a pair of fastening members 3 adapted to secure the main body 2 onto the aquarium wall "a", and three partitions 4 dividing the inner space of the main body 2 into separated cells, which cells are arranged from side to side.

Figure 2:
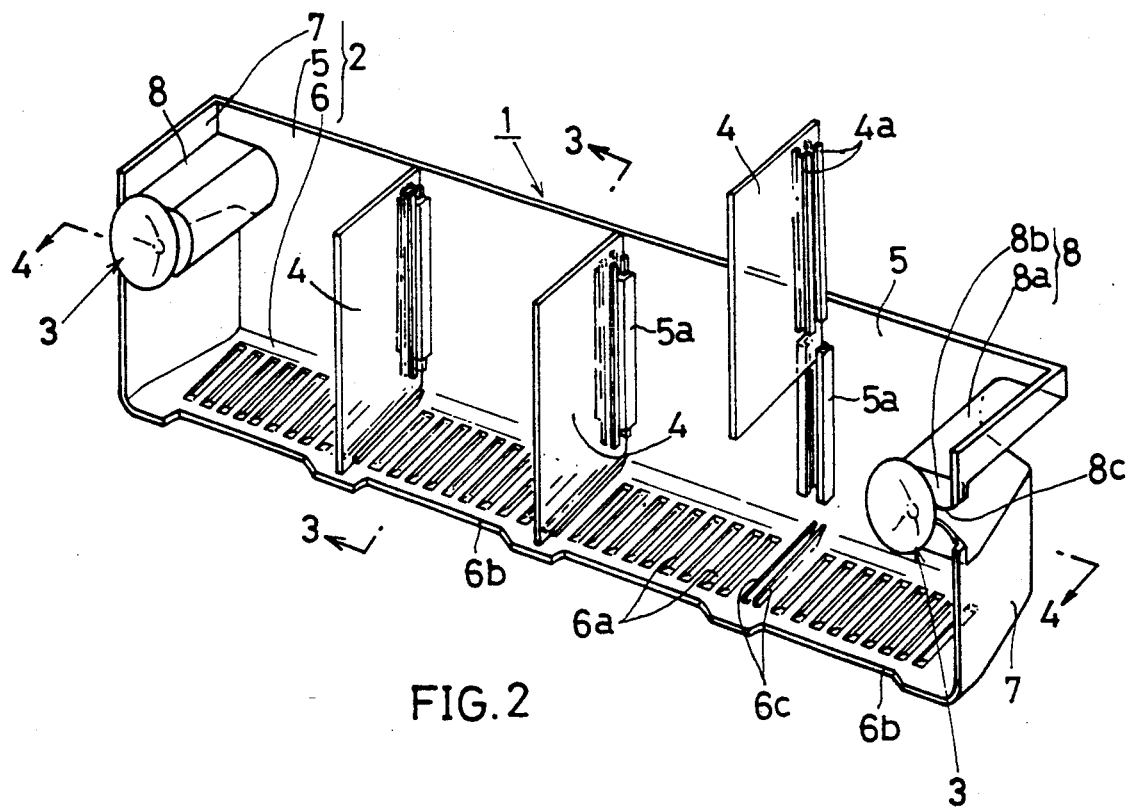
FIG. 2 is another perspective view showing the assembly on an enlarged scale, with one of partitions being removed.
Figure 3:
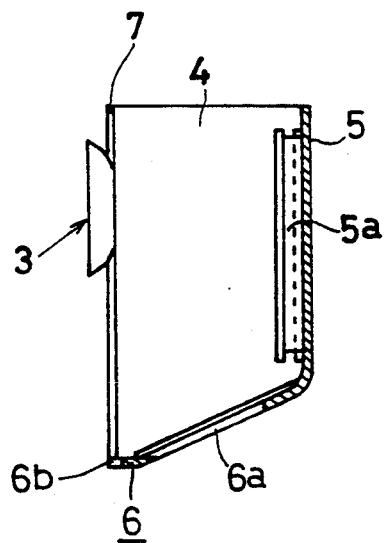
FIG. 3 is a cross section taken along the line 3—3 in FIG. 2.
Figure 4:
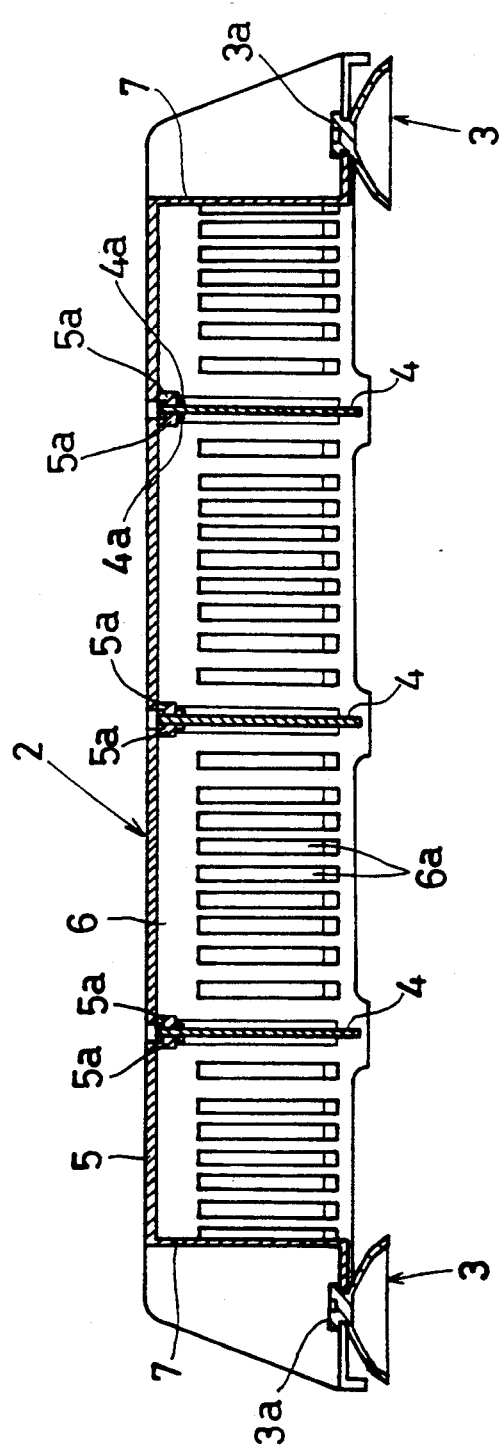
FIG. 4 is also a cross section taken along the line 4—4 in FIG. 2.

As seen from FIG. 2, the main body 2 which is an integral piece molded of a transparent rigid plastics is composed of a rectangular back wall 5 long sideways, a bottom plate 6 extending forwards and slightly downwards from the lower edge of back wall 5, a pair of opposite side walls 7 each connected to the side edges of back wall 5 and bottom plate 6. The main body 2 thus has the open top and open front faces, and extends long sideways. A preferable example of the plastics is polystyrol resin, but instead the main body may be molded of any other suitable resin such as acrylic resin, polyvinyl chloride resin, polyethylene, polycarbonate resin or the like.

The fastening members 3 which detachably secure the main body 2 to the wall "a" of aquarium "A" are received in main body's fixing portion 8. Each fixing portion is formed at an upper and side extremity of the open front of the main body 2. And as shown in FIG. 2, each fixing portion is disposed near an upper end of the side wall 7 and comprises a semicylinder 8a merging into the back wall 5 and having its front surface covered with a front plate 8b. A slit 8c extends inwardly from the outer edge of front plate 8b, and comprises at its innermost region a slightly enlarged portion.

Sucking discs are employed as the fastening members 3. Each sucking disc has a base portions 3a fitting in the enlarged portion of the slit 8c. The respective base portion 3a are inserted into the respective slits 3, from the side extremities thereof, so as to fix the fastening members 3 in place.

The main body 2 is removably attached to the wall "a" of the household aquarium "A" as shown in FIG. 1, with the sucking discs 3 being tightly attracted to the inner surface of aquarium wall "a". Thus, the open front face of the body 2 is closed entirely with said inner surface of the aquarium wall "a" which is substantially in contact with the body's open front face. The open top face of the main body 2 need be positioned above the water level in the aquarium "A". In this state, the aquarium wall "a" and the main body 2 cooperate to produce a closed space within the household aquarium. Fresh water therein will be caused to always flow through the closed space. In order to prevent the solid wastes from accommodated fishes from depositing in said space, the bottom plate may comprise slits 6a formed therethrough. It may be possible to substitute a plurality of holes for the slits. Further, such slits or holes may be formed through the back wall 5 and/or through side walls 7, in addition to or in place of those formed through the bottom plate 6.

The bottom plate 6 has along its front edge four shallow cutouts 6b extending sideways. Due to those cutouts, slits may be formed between the front edge and the inner surface of the aquarium wall "a" on which the main body is mounted.

The space encircled by the main body 2 and aquarium wall "a" is divided into four cells "X" by three partitions 4, which are removably placed in the main body and arranged at proper intervals in the longitudinal direction of the space. The partitions 4 are of such a shape as corresponding to the cross section of the cells "X", and pairs of parallel vertical lugs 4a protrude respectively from the partitions' right and left surface portions adjacent to their rearward vertical edges. A pair of vertical retaining guides 5a are formed on the main body's back wall 5 at their surface portions corresponding to each partition. The retaining guides 5a protrude forwards and have forward vertical edges facing one another. Each partition's 4 rearward portion is inserted in between the pair of retaining guides 5a, with its vertically extending lugs 4a being slidably retained thereby. Thus, the main body 2 will keep in place the partitions 4 capable of being withdrawn upwards. In order to stabilize the inserted position of each partition 4, a pair of horizontal lugs 6c are formed on the bottom plate 6.

In use, it is convenient to breed fishes one in each cell "X" in a case wherein these fishes are, for example, the fighting fishes which need be separated from other inoffensive fishes bred within the principal space of household aquarium. However, the cells may accommodate also the same fishes as those which are bred in the principal space outside the cells. One or more partitions 4 may be removed to provide a larger cell or cells, if necessary.

In a case wherein the fighting fishes called "betta" are bred in some cells, the partitions 4 defining same need be a plate having a transparency limited to such a degree that the fighting fishes in adjacent cells will not irritate one another. The abovedescribed embodiment regards the aesthetic appearance of aquarium as important so that a blue-colored transparent or translucent plastics sheet is employed to manufacture the partitions. The plastic sheet may be tinted with any color other than blue. It is also possible to employ the frosted glass plates instead of plastics sheet. Further, any opaque plate may be used to render blinded some fishes to the others. That is, the partitions 4 may be made of any material, have any degree of transparency or any thickness insofar as the "betta" fishes "B" in the neighboring cells are prevented from clearly seeing through the partitions and irritating one another.

With such a limited transparency of the partitions 4 of the cells "X" for the neighboring betta fishes "B", the outstretched fins thereof cannot be observed. If however a watcher wants to observe the betta fishes which are quarreling over their territories and frightening one away another, then he need merely remove the partition of limited transparency or substitute an uncolored clear plate therefor. He will be able to see in this way their interesting behavior, namely their outstretched fins.

In summary, the invention provides a household aquarium with the cell-forming assembly which comprises the main body having open top and front faces, the fastening members for attaching the main body to the aquarium, and the partitions for dividing the space of the main body. Therefore, the cell-forming assembly can be used with any unmodified conventional or existing aquarium so as to form easily and surely any desired number of cells. The single household aquarium can thus accommodate in a safe manner the fighting fishes such as betta separated from other aquarium fishes.

The cell-forming assembly of the invention comprises the partitions of so limited transparency as not to cause the fishes to irritate one another, whereby the fighting fishes can not only be bred and observed in their natural state, but also their interesting behavior when they quarrel over territories with their outstretched fins to threaten one another can be observed by removing the partitions or by replacing same with transparent ones.

What is claimed is:

1. A cell-forming assembly for use with a household aquarium, the assembly comprising:
   an elongated main body and having an open top and open front faces;
   the main body comprising a rectangular back wall, a bottom plate extending forwardly from lower edge of the back wall, a pair of opposite side walls connected to both side edges of the back wall and bottom plate;
   fastening members attached to the main body so as to detachably secure it to an aquarium wall so that the open front face of the main body may be disposed substantially in contact with an inner surface of a wall of the aquarium;
   at least one partition detachably held inside the main body so that an internal space defined by the main body and aquarium wall is divided into a row of cells arranged from side to side, wherein the partition is made of a plate which is of a transparency limited to such a degree that aquarium fishes in adjacent cells are not caused to irritate one another;
   wherein a plurality of slits parallel to each other in each compartment are formed through the bottom plate of the main body to permit the removal of solid wastes from the cell;
   wherein pairs of vertical retaining guides are formed at given intervals to protrude forwardly and inwardly of the main body's back wall, the vertical retaining guides having forward vertical edges with the edges facing one another;

each partition has a pair of parallel vertical lugs which protrude respectively from the partitions's right and left surface portions adjacent to the partition's rearward vertical edge so as to be retained by the retaining guides, whereby the main body detachably keeps in place the partitions; and wherein the main body is an integral piece molded of a rigid plastic.

2. A cell-forming assembly according to claim 1, wherein the main body comprises fixing portions which are each formed near an upper end of the side wall and comprises a semicylinder extending inwardly of the side wall to merge into the back wall, having a front surface covered with a front plate, and a slit extending inwardly from the outer edge of front plate, the slit having at its innermost region a slightly enlarged portion, and wherein sucking discs as the fastening members have base portions each fitted in the enlarged portion of the slit.

3. A cell-forming assembly according to claim 1, wherein the partitions are made of a colored transparent plastics sheet.

4. A cell-forming assembly according to claim 1, wherein the partitions are made of a material having a ground surface.

* * * * *